(12) United States Patent
Tye et al.

(10) Patent No.: US 12,039,344 B2
(45) Date of Patent: *Jul. 16, 2024

(54) LOADER AND RUNTIME OPERATIONS FOR HETEROGENEOUS CODE OBJECTS

(71) Applicant: Advanced Micro Devices, Inc., Santa Clara, CA (US)

(72) Inventors: Steven Tony Tye, Boxborough, MA (US); Brian Laird Sumner, Bellevue, WA (US); Konstantin Zhuravlyov, Bellevue, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/673,647

(22) Filed: Feb. 16, 2022

(65) Prior Publication Data

US 2022/0171635 A1 Jun. 2, 2022

Related U.S. Application Data

(63) Continuation of application No. 16/692,338, filed on Nov. 22, 2019, now Pat. No. 11,256,522.

(51) Int. Cl.
*G06F 9/44* (2018.01)
*G06F 8/76* (2018.01)
*G06F 9/445* (2018.01)

(52) U.S. Cl.
CPC ............ *G06F 9/44521* (2013.01); *G06F 8/76* (2013.01)

(58) Field of Classification Search
CPC .............................. G06F 9/44521; G06F 8/76
See application file for complete search history.

(56) References Cited

U.S. PATENT DOCUMENTS

| | | | |
|---|---|---|---|
| 5,933,642 A | 8/1999 | Greenbaum et al. | |
| 6,259,958 B1 | 7/2001 | Steinman et al. | |
| 7,941,791 B2 | 5/2011 | Wang et al. | |
| 8,522,223 B2 | 8/2013 | Wang et al. | |
| 10,824,442 B2 | 11/2020 | Ruder et al. | |
| 2003/0177129 A1* | 9/2003 | Bond | G06F 9/445 |
| 2004/0083462 A1 | 4/2004 | Gschwind et al. | |
| 2004/0139342 A1 | 7/2004 | Aho et al. | |
| 2005/0081184 A1 | 4/2005 | Deedwaniya et al. | |
| 2005/0204351 A1* | 9/2005 | Jiang | G06F 9/44521 |
| | | | 717/162 |

(Continued)

*Primary Examiner* — Hang Pan
(74) *Attorney, Agent, or Firm* — Volpe Koenig (57) ABSTRACT

Described herein are techniques for executing a heterogeneous code object executable. According to the techniques, a loader identifies a first memory appropriate for loading a first architecture-specific portion of the heterogeneous code object executable, wherein the first architecture specific portion includes instructions for a first architecture, identifies a second memory appropriate for loading a second architecture-specific portion of the heterogeneous code object executable, wherein the second architecture specific portion includes instructions for a second architecture that is different than the first architecture, loads the first architecture-specific portion into the first memory and the second architecture-specific portion into the second memory, and performs relocations on the first architecture-specific portion and on the second architecture-specific portion.

20 Claims, 9 Drawing Sheets

(56) References Cited

U.S. PATENT DOCUMENTS

| | | |
|---|---|---|
| 2006/0123401 A1 | 6/2006 | O'Brien et al. |
| 2008/0028383 A1 | 1/2008 | Archambault et al. |
| 2009/0158248 A1* | 6/2009 | Linderman ............. G06F 9/505 |
| | | 717/106 |
| 2010/0122264 A1* | 5/2010 | Xiaocheng ............ G06F 12/109 |
| | | 719/330 |
| 2010/0205580 A1 | 8/2010 | McAllister et al. |
| 2010/0313079 A1 | 12/2010 | Beretta et al. |
| 2012/0272210 A1 | 10/2012 | Ni et al. |
| 2013/0173894 A1 | 7/2013 | Yan et al. |
| 2014/0244983 A1* | 8/2014 | McDonald ............ G06F 9/5044 |
| | | 712/225 |
| 2015/0256484 A1 | 9/2015 | Cameron |
| 2016/0092181 A1 | 3/2016 | Rodgers et al. |
| 2017/0003942 A1 | 1/2017 | Gshwind |
| 2018/0074835 A1 | 3/2018 | Smith |
| 2018/0203676 A1 | 7/2018 | Howe |

\* cited by examiner

LOADER AND RUNTIME OPERATIONS FOR HETEROGENEOUS CODE OBJECTS

CROSS-REFERENCE TO RELATED APPLICATIONS

This application is a Continuation of U.S. patent application Ser. No. 16/692,338, filed on Nov. 22, 2019, the entirety of which is hereby incorporated herein by reference.

BACKGROUND

Increasingly, computing systems are employing processing architectures of different types to process workloads in a cooperative manner. In an example, a central processing unit offloads processing work to a graphics processing unit. Improvements to techniques for performing such cooperative processing are constantly being made.

BRIEF DESCRIPTION OF THE DRAWINGS

A more detailed understanding is provided by the following description, given by way of example in conjunction with the accompanying drawings wherein.

DETAILED DESCRIPTION

Described herein are techniques for executing a heterogeneous code object executable. According to the techniques, a loader identifies a first memory appropriate for loading a first architecture-specific portion of the heterogeneous code object executable, wherein the first architecture specific portion includes instructions for a first architecture, identifies a second memory appropriate for loading a second architecture-specific portion of the heterogeneous code object executable, wherein the second architecture specific portion includes instructions for a second architecture that is different than the first architecture, loads the first architecture-specific portion into the first memory and the second architecture-specific portion into the second memory, and performs relocations on the first architecture-specific portion and on the second architecture-specific portion.

Figure 1:
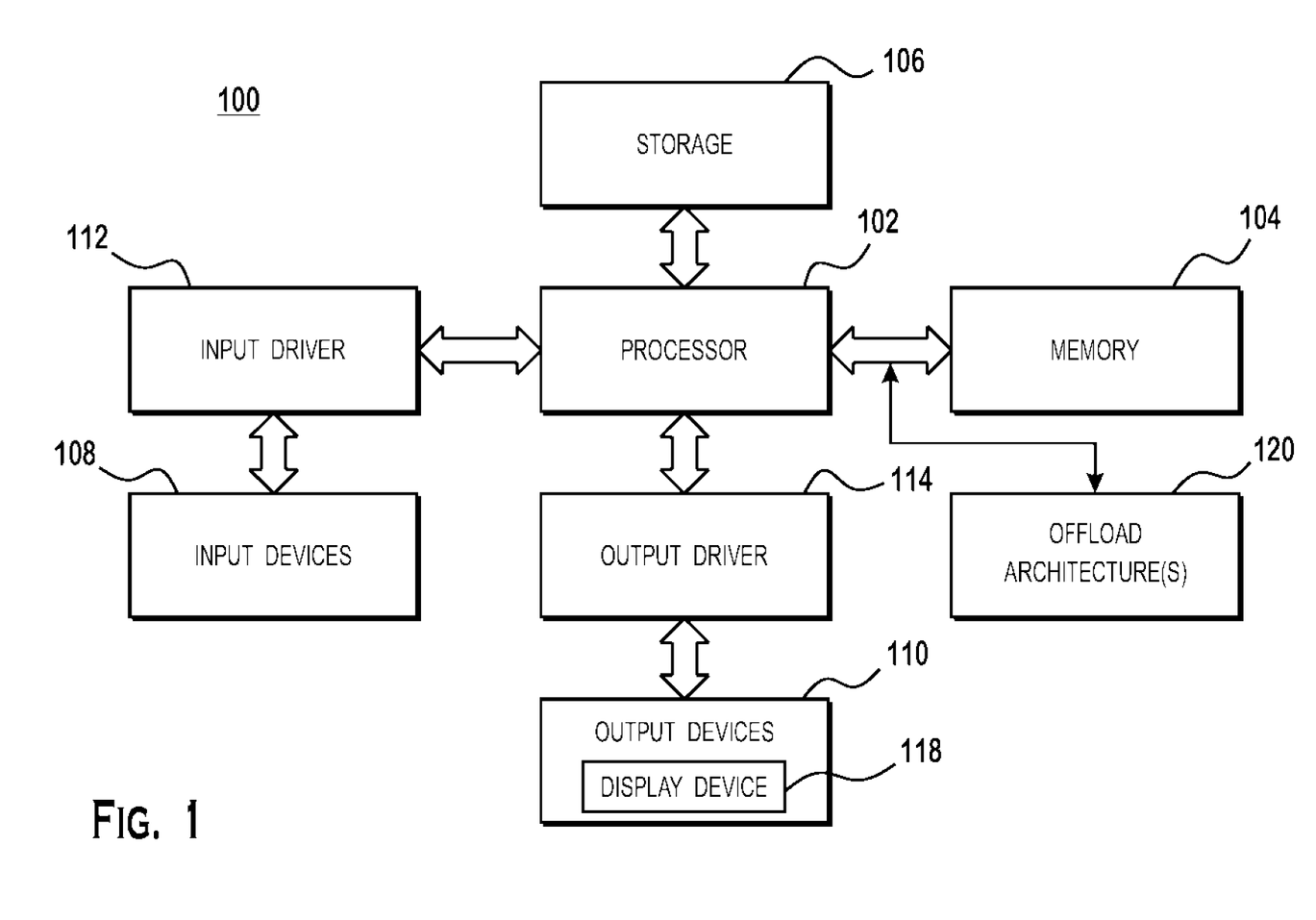
FIG. 1 is a block diagram of an example device in which one or more features of the disclosure can be implemented.

FIG. 1 is a block diagram of an example device 100 in which one or more features of the disclosure can be implemented. The device 100 includes, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 also optionally includes an input driver 112 and an output driver 114. It is understood that the device 100 includes additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In other alternatives, the processor 102 includes a digital signal processor or a different type of processor. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display device 118, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

One or more offload architectures 120 are also present. Offload architectures 120 are processing units having architectures (e.g., different instruction sets) that differ from the processor 102. In an example, the processor 102 is a central processing unit and one of the offload architectures 120 is a graphics processing unit. Together, the system including the processor 102 and one or more offload architectures 120 is referred to as a heterogeneous architecture herein. Herein, the processor 102 is referred to as the main architecture.

Compiling and executing programs that include instructions for a heterogeneous architecture (e.g., for processing on the processor 102 and one or more offload architectures 120) is more complicated than doing so for programs that are targeted to only a single architecture. Improved techniques are therefore provided for compiling and executing programs having instructions directed to multiple architectures.

Figure 2A:
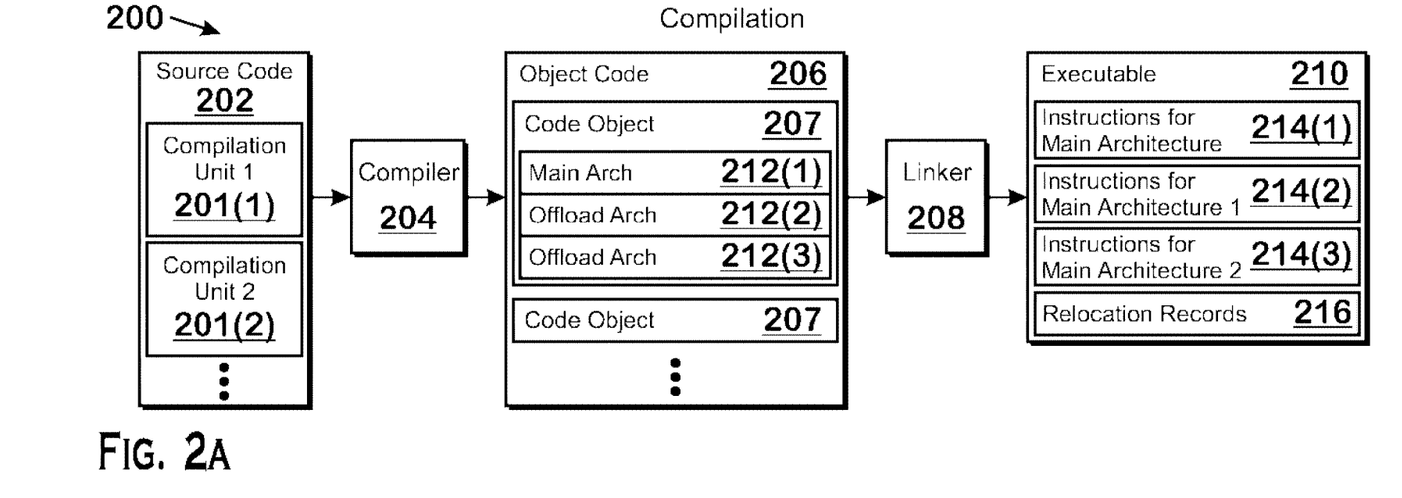
FIG. 2A illustrates an example technique for compiling source for multiple architectures, including a main architecture an one or more offload architectures.

FIG. 2A illustrates an example technique for compiling source for multiple architectures, including a main architecture an one or more offload architectures. In some implementations, an "architecture" is defined as a hardware processor that processes code in a given instruction set architecture. In some implementations, "architectures" are more granular, and a specific type of hardware can have multiple "architectures," each with different requirements for the executable. More specifically, it is sometimes possible to compile a given piece of source code in two or more different ways ("compilation modes") for a given hardware architecture. In an example, in one compilation mode, code is compiled to use a first number of registers and in another compilation mode, code is compiled to use a second number of registers. In some implementations, the term "architecture" used herein applies to the hardware architectures and compilation modes. For instance, if there is one compilation mode for a central processing unit, but two compilation modes for a graphics processing unit, then each of the central processing unit, the first compilation mode for the graphics processing unit, and the second compilation mode for the graphics processing unit is considered an "architecture."

According to the compilation operation 200, the source code 202 includes one or more compilation units 201 (which in some implementations are source code files). Each compilation unit 201 includes an indication of one or more architectures that that compilation unit 201 targets. The compiler 204 compiles the compilation units 201 into object code 206. The object code 206 includes object code for each of the different architectures 212. More specifically, each compilation unit 201 includes an indication of one or more architectures targeted for the compilation unit 201. For each compilation unit 201, the compiler generates a code object 207 for each architecture specified for that compilation unit 201. At least some code objects 207 generated for an executable 210 thus are considered "heterogeneous code objects" in that those code objects include object code targeted to different architectures. For each architecture specified for a code object 207, the code object 207 includes an indication of which code is targeted to which architecture.

Compilation by the compiler includes a number of steps. Some such steps include conversion to an intermediate representation by a front end and conversion from the intermediate representation into object code by a back end. Compilation also typically includes optimization steps which can happen at any stage of compilation, such as between the front end and back end.

Object code 206 is compiled code having object code instructions. The object code instructions are machine instructions or intermediate language instructions. The "unit" of object code 206 is a code object 207. In some implementations, each code object 206 corresponds to a compilation unit 201. Thus, the compiler 204 converts each compilation unit 201 to a code object 207. In an example, each compilation unit 201 comprises a source code file and each code object 207 includes the object code instructions that correspond to that source code file. In an example, a code object 207 is an object code file. One code object 207 includes object code compiled based on one source code file, and no other source code file. Similarly, the compiler 204 generates one code object 207 per source code file. Although an example in which there is one compilation unit 201 per code object 207 is described, the present disclosure is not so limited and the compiler 204, in various implementations, generates any number of code objects 207 for a given number of compilation units 201. Further, code objects 207 that include code for multiple architectures are referred to as heterogeneous code objects herein.

Each code object 207 includes internal symbols that reference entities within that code object 207 and external symbols that reference entities in one or more other code objects 207. In an example, one symbol in one code object is a symbolic reference to a function, where the instructions for that function reside in a different code object 207. In another example, one symbol in one code object 207 references a global variable.

The object code 206 includes object code instructions for each of the architectures specified by the source code 202. In the example of FIG. 2A, the object code 206 includes object code instructions for a main architecture 212(1), object code instructions for offload architecture 1 212(2), and object code instructions for offload architecture 2 212(3). In some implementations, each code object 207 includes object code instructions for multiple architectures.

A linker 208 combines the object code 206 into an executable 210. The executable 210 includes machine instructions corresponding to the object code instructions, where symbols of the object code 206 have been converted to memory references to addresses within the executable 210. The executable 210 includes instructions for each of the different architectures specified by the source code 202. Thus the executable 210 includes instructions for the main architecture 214(1), instructions for offload architecture 1 214(2), and instructions for offload architecture 2 214(3).

The linker 208 converts the symbols in the object code 206 to addresses in the executable 210. More specifically, a symbol of a code object 207 of the object code 206 symbolically refers to an entity external to that code object 207. In other words, that symbol does not refer to an address. The linker 208 joins the code objects 207 together into a single executable 210, placing the different code objects 207 together into a code layout. Because the instructions have known positions in the memory layout defined in the executable 210, the linker 208 is able to convert the symbols into memory address references. In an example, a first code object 207 includes a symbol that is a reference to a function in a second code object 207. After assigning memory addresses to the code of the first code object 207 and the second code object 207 in the executable 210, the linker 208 converts the symbol to the address of the function in the executable 210.

The executable 210 includes relocation records 216. Relocation records are indications of memory addresses that are to be changed when the executable 210 is actually loaded into memory for execution. More specifically, as shown in loading operation 250 in FIG. 2B, when an executable 210 is loaded into memory, a loader of the operating system places that executable 210 into a particular memory location. This memory location is not known to the executable 210, and so the addresses in the executable 210 (referenced, for example, by control flow instructions, or instructions to read from or write to memory) are not correct. The relocation records 216 indicate to the loader 254 where the relocatable memory addresses are and thus indicate to the loader 254 what memory addresses to change when the executable 210 is loaded into memory. In an example, a particular machine instruction in the executable 210 includes a function call to a function located at memory address 0x1000. The executable 210 also includes a relocation record 216 indicating that the above memory address should be modified as appropriate when the executable 210 is loaded into memory. In this example, when the operating system loads the executable 210 into memory, the operating system places the function into memory address 0x50000000, and therefore changes the above memory address to 0x50001000. In various examples, relocation records are used for jumps, branches, function calls, global variables, and so on. In various implementations, relocation records exist for both external symbols of code objects 207

Figure 2B:
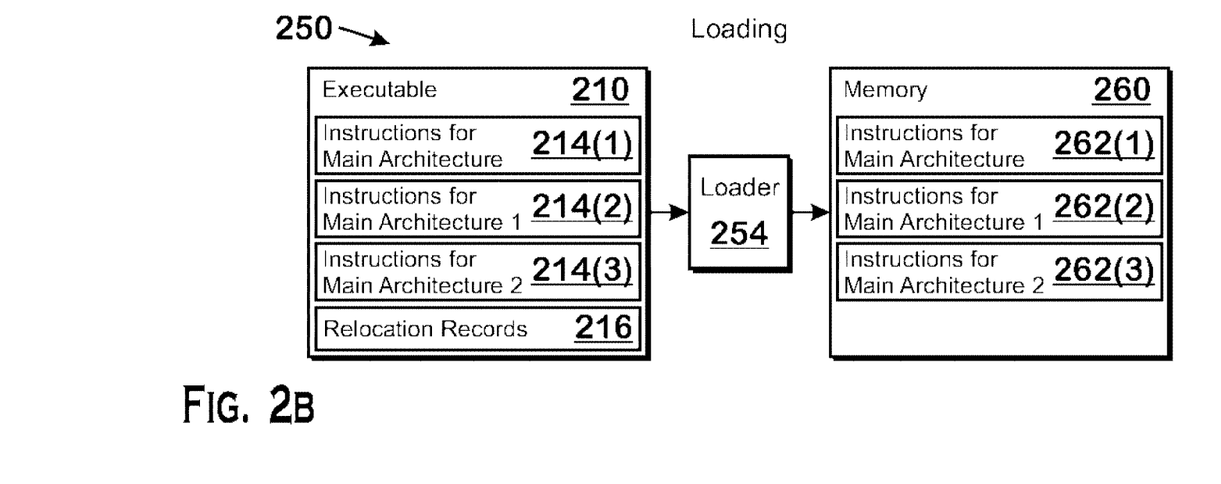
FIG. 2B illustrates an example loading operation for an executable including heterogeneous code.

(that is, symbols that reference entities in other code objects 207) as well as internal symbols of code objects 207 (symbols that reference entities in the same code object as the symbol).

The relocation records 216 are found in portions of the executable 210 associated with a specific architecture and are thus themselves associated with the associated architecture. Some relocation records 216 are not associated with any particular architecture and are placed in a part of the executable 210 associated with "generic" relocation records. An example of non-architecture-specific relocation records 216 includes a global offset table, which includes relocation records for global data (e.g., global variables) that is accessible by multiple architectures.

The compilation operation 200 of FIG. 2A and the loading operation 250 are performed in any appropriate computer system, such as the device 100 illustrated in FIG. 1. The compilation operation 200 is performed in the same computer system or in a different computer system as the loading operation 250.

Figure 3:
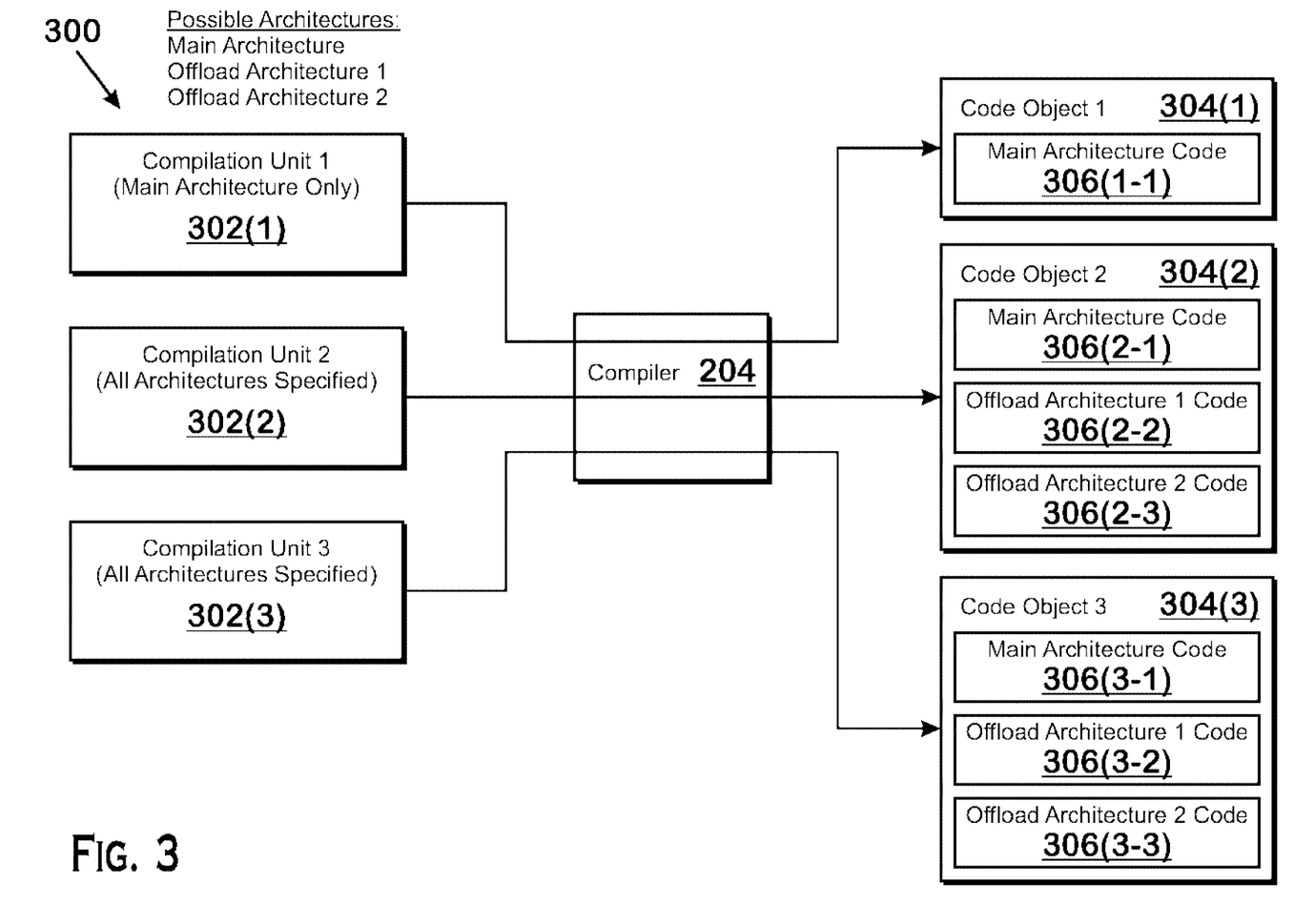
FIG. 3 is a diagram illustrating details of a compilation operation, according to an example.

FIG. 3 is a diagram illustrating details of a compilation operation 300, according to an example. In this example compilation operation 300, a compiler 204 compiles compilation units 302 to generate code objects 304. The compilation units 302 include compilation unit 1 302(1), compilation unit 2 302(2), and compilation unit 3 302(3). In addition, the list of all possible architectures that can be specified for the compilation units 302 includes a main architecture (such as a CPU) and two offload architectures. Compilation unit 1 302(1) is marked as being only for the main architecture, and compilation units 2 and 3 are marked as being for all of the architectures listed, which includes the main architecture, offload architecture 1, and offload architecture 2.

The compiler 204 compiles each of the compilation units 302 into the corresponding code objects 304. Because compilation unit 1 302(1) is marked as main architecture only, code object 1 304(1), which includes object code for compilation unit 302(1), includes object code corresponding to compilation unit 1 302(1) for the main architecture, but not for the other architectures (offload architecture 1 or 2). For compilation unit 2 302(2), all architectures are specified. Thus the compiler 204 generates code object 2 304(2) including object code for the main architecture 306(2-1), object code for offload architecture 1 306(2-2), and object code for offload architecture 2 306(2-3). For compilation unit 3, all architectures are specified, and thus the compiler 204 generates code object 3 304(3) including object code for the main architecture 306(3-1), object code for offload architecture 1 306(3-2), and object code for offload architecture 2 306(3-3).

Generating object code for different architectures means that the compiler 204 generates instructions appropriate for execution on the targeted architecture hardware for a given compilation unit 302. In an example, compilation unit 2 302(2) includes a function to perform a matrix multiplication. For a CPU, the compiler would generate a compiled function that includes instructions appropriate for the CPU architecture (the main architecture) to perform a matrix multiplication and would generate another compiled function that includes instructions appropriate for GPU architecture (offload architecture 1) to perform a matrix multiplication. Additional details regarding compiler operations are included elsewhere herein, such as with respect to FIGS. 6, 7, and 8.

Figure 4:
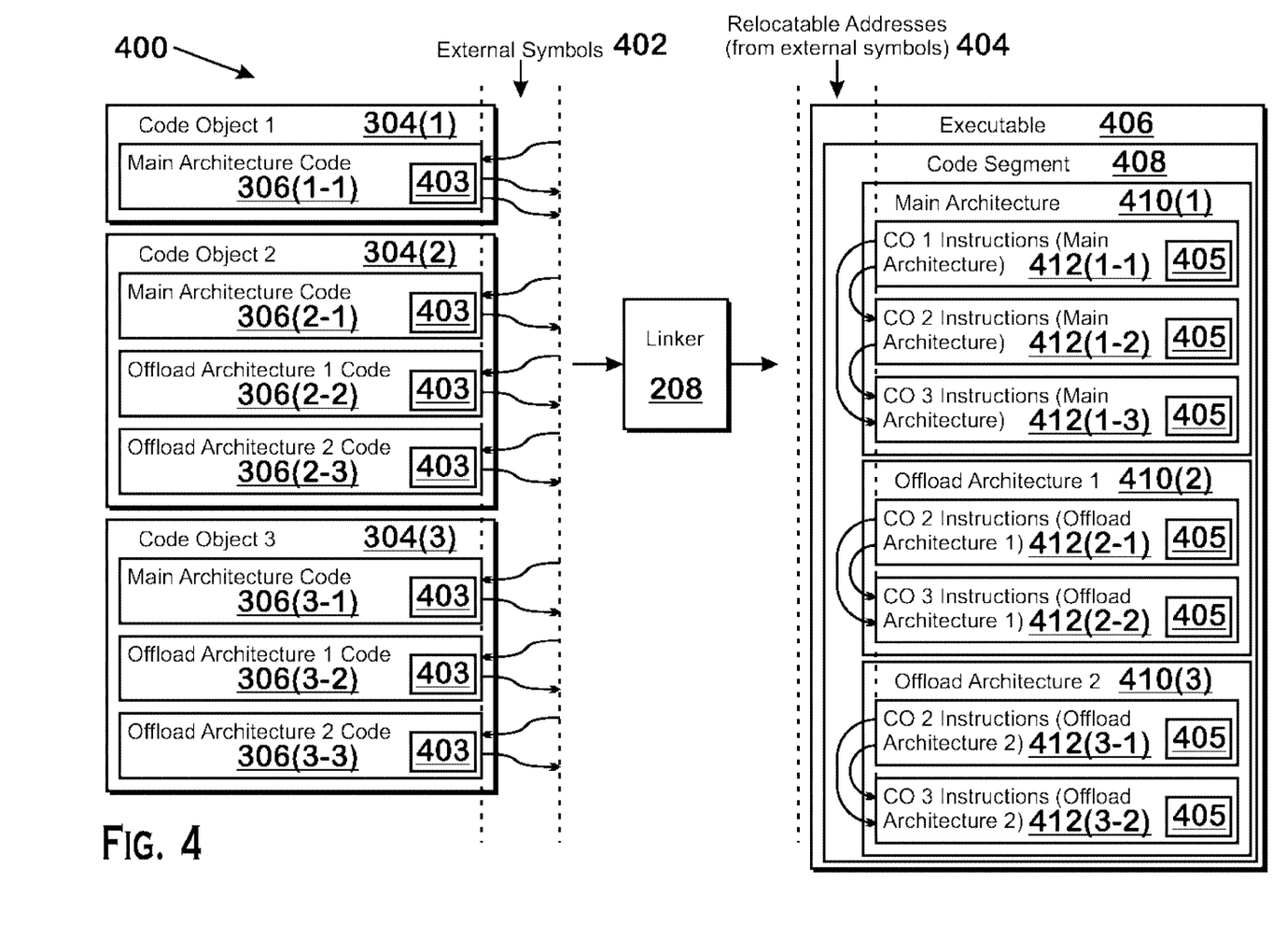
FIG. 4 illustrates a linking operation, according to an example.

FIG. 4 illustrates a linking operation 400, according to an example. The object code 304 generated by the compiler 204 includes external symbols 402 and internal references 403. The external symbols 402 are symbolic links (rather than links by address) to items outside of a particular code object 304. The internal references 403 are references, within a particular code object 304, to addresses within that code object 304. An example of an external symbol is a reference, in a particular code object, to a function in a different code object. In an example, source 2 includes a call to a function in source 3. An external symbol 402 thus makes a symbolic reference to a function, and that function happens to be in source 3. In an example, an external symbol is a function name, and the function is declared by that name in source 3. An example of an internal reference 403 is a reference, in a code object 304, to a function that is also in that code object 304.

The linker 208 lays out instructions corresponding to the object code into an executable 406. The instructions in the executable are assigned memory addresses. In addition, the executable 406 includes a code segment 408—a portion of the executable 406 that defines instructions (as opposed to, for example, data). The code segment 408 includes a main architecture portion 410, an offload architecture 1 portion 410(2), and an offload architecture 2 portion 410(3). Each architecture portion 410 includes instructions for a corresponding architecture (e.g., the main architecture portion 410(1) includes instructions for the main architecture) and not for any other architecture. The main architecture portion 410(1) includes code object ("CO") 1 instructions for the main architecture 412(1-1), code object 2 instructions for the main architecture 412(1-2), and code object 3 instructions for the main architecture 412(1-3). The code object 1 instructions for the main architecture 412(1-1) are derived from the main architecture code 306(1-1) of code object 1 304(1). Similarly, the code object 2 instructions 412(1-2) and code object 3 instructions 412(1-3) are derived from main architecture code 306(2-1) from code object 2 304(2) and main architecture code 306(3-1) from code object 3 304(3), respectively. The offload architecture 1 portion 410 (2) includes code object 2 instructions 412(2-1) derived from offload architecture 1 code 306(2-2) and code object 3 instructions 412(2-2) derived from offload architecture 2 code 306(2-3). The offload architecture 2 portion 410(3) 410(3) includes code object 2 instructions 412(3-1) derived from offload architecture 2 code 306(2-2) and code object 3 instructions 412(3-2) derived from offload architecture 2 code 306(3-3).

As part of generating the executable 406 from the object code 304, the linker 208 lays out the instructions in the executable 406. The linker 208 thus assigns each of the instructions in the executable 406 addresses. The linker 208 is therefore able to (and does) convert the external symbols 402 to relocatable addresses 404 within the code segment 408. More specifically, because the instructions have been assigned addresses, the external symbols 402, which refer to entities symbolically in the object code 304, are converted to addresses in the code segment 408 or a data segment (not shown). In an example, source 2 object code 304(2) includes an external symbol that is a reference to a function in source 3 object code 304(3). In the code segment 408, because the function in source 3 has been assigned an address, the external symbol is converted to that address. In a similar manner, the linker 208 converts the internal symbols 403 to internal addresses 405 in the executable 406, because those addresses are now known in the executable 406.

These relocatable addresses 404 that are derived from the external symbols 402 are relocatable because the addresses are relocated by a loader 254 when the executable 406 is loaded into memory, as described elsewhere herein. The addresses 405 derived from internal symbols 403 are also relocatable for similar reasons.

Figure 5:
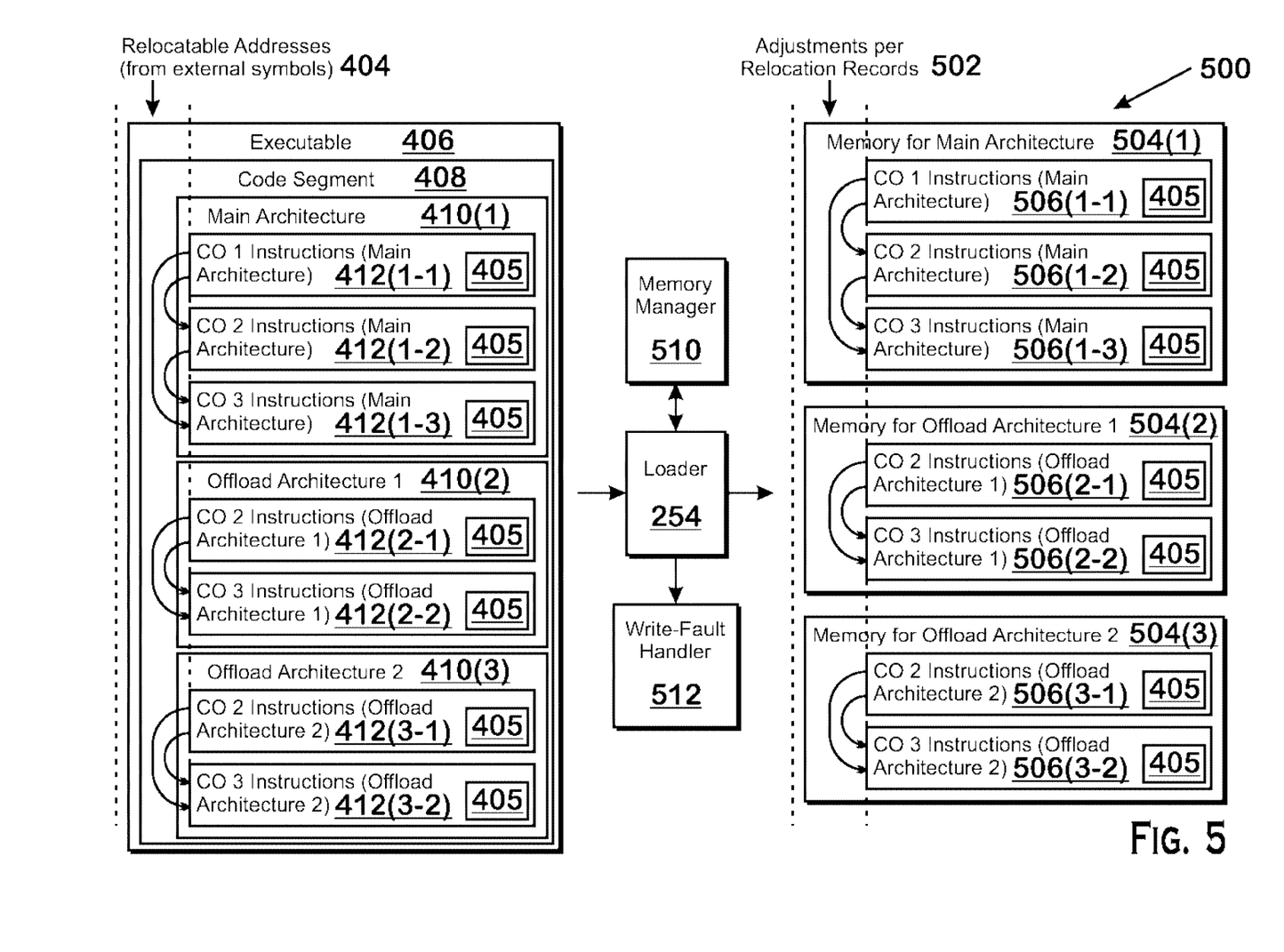
FIG. 5 illustrates a loading operation, according to an example.

FIG. 5 illustrates a loading operation 500, according to an example. When a computer system initiates execution of the executable 406, the loader 254 loads the executable 406 into memory (from, e.g., a hard disk drive). The loader 254 is a component of the operating system and not a part of the executable 406. The loader 254 identifies specific memories that are accessible by each given architecture and places instructions into memories appropriate for the architecture specified for the instructions. In the example illustrated, the loader 254 places the instructions for the main architecture 410(1) in memory for the main architecture 504(1) (e.g., system memory), places the instructions for offload architecture 1 into a memory of the offload architecture 1 504(2), and places the instructions for offload architecture 2 into a memory of the offload architecture 2 504(3).

In some implementations or situations, the loader 254 identifies a memory that is appropriate for a given architecture by identifying the memory that is local to that architecture. In an example, system memory 104 is local to the processor 102 which is a central processing unit. In addition, the offload architecture 1 is a graphics processing unit, and memory local to offload architecture 1 is graphics processing unit memory (e.g., memory that is physically located on a graphics processing unit board, on which a GPU chip is also located). In one example, a computer system includes a main architecture and an offload architecture (which, in some examples are a CPU and a GPU, respectively) that share system memory. In such examples, the shared memory is considered the appropriate memory for both the main architecture and the offload architecture. In some examples, a memory manager 510 is present in the system. The loader 254 queries the memory manager 510 (or other entity) as to what the appropriate memory is for a given architecture, and the memory manager 510 provides an identification of an appropriate memory in response.

In some examples, the memory manager 510 manages a shared virtual memory address space and manages virtual-to-physical memory address mappings. In these examples, instructions and data in more than one of the architectures (e.g., the main architecture and the offload architecture 1) are loaded at virtual memory addresses in the shared virtual memory address space. In such systems, in some implementations, the loader 254 loads only a single instance of a given set of instructions (e.g., a function or a code object) in the virtual memory address space, as a read-only set of instructions. In instances where there are multiple instances of processing units for a given architecture, the memory manager 510 copies the instructions loaded as read-only instructions into memory local to each of the processing units, in response to the processing unit accessing the instructions. Because relocations are performed and then the instructions are copied, relocations (described elsewhere herein) are not performed for each of the multiple instances, but only for one of the instances of any particular architecture. Although the instructions are loaded as read-only instructions, it is possible that some items, such as global offset tables (which refer to global variables) or procedure linkage tables (which refer to runtime-linked functions), are to be modified. In that instance, the loader 254 attempts to make such modifications, which triggers an access fault. A specialized write-fault handler 512 handles the fault and modifies the items as necessary, despite the given information being stored at read-only addresses.

As described elsewhere herein, the executable 406 includes relocatable addresses 404. Relocation records (not shown) in the executable 406 identify to the operating system (e.g., a loader 254) the relocatable addresses 404. The loader 254 performs relocations on these relocatable addresses 404 in the course of loading the executable 406 into memory. More specifically, the loader 254 loads instructions and data from an executable 406, placing the instructions and data into memory 504, and noting the addresses of the instructions and data. The loader 254 modifies the relocatable addresses 404 to refer to actual addresses in memory.

In an example, in the offload architecture 1 410(2) portion of the code segment 408 in the executable 406, the code object 2 instructions 412(2-1) include a call to a function in the code object 3 instructions 412(2-2). The call references address 0x100001000, which is the address of the called function. When loaded into memory 504, the function is actually placed at address 0x81001000. Thus the loader 254 modifies the address referenced by the function call (e.g., in code object 2 instructions for offload architecture 1 506(2-1), which is loaded into memory for offload architecture 1 504(2) to the address 0x81001000, which is in memory for offload architecture 1 504(2), within the code object 3 instructions for offload architecture 1 506(2-2). Relocation records are sometimes also used for data such as global variables, and are sometimes used for control flow transfers other than function calls, such as branches, jumps, and the like.

It is possible for relocations to occur "across architectures." More specifically, although control flow typically occurs only within a single architecture (because each architecture can typically only execute instructions from that architecture and not another architecture), it is possible for instructions of any architecture to reference addresses holding instructions or data for a different architecture. In an example, a global variable is declared by code object 1 instructions 506(1-1). When loaded into memory (in memory for main architecture 504(1)), that global variable is assigned a particular memory location and the corresponding relocation record for the main architecture causes references to that global variable to point to the actual location in memory of that global variable. It is possible for references to that global variable to also exist in instructions for offload architecture 1 or offload architecture 2. The loader 254 would modify those references based on the location of the variable as defined for the main architecture, and thus the relocation would occur "across architectures." In other words, a reference in instructions for one architecture is modified to refer to the actual address as specified for a different architecture. To put this concept differently, it is possible for instructions for different architectures to reference the same address, and thus for the relocation records to cause instructions of different architectures to refer to the same address when relocated by the loader 254 of the operating system.

In addition to data, it is also possible for references to addresses of functions to be relocatable across architectures. In an example, and as described elsewhere herein, an instruction that assigns a function address to a function pointer does so by referencing the address of the function in the main architecture. When the function pointer is called by an architecture other than the main architecture, the calling instruction calls a function using an address that is offset from the address for the main architecture function, where the offset is based on which architecture is calling the function pointer. Because the appropriate address is relative to the address of the main architecture function, each function pointer, regardless of architecture, references the main architecture function. Thus when the loader 254 relocates the address of a function that is referenced by a function pointer, the loader 254 relocates that address for references made by any architecture. In an example, in a first portion of code, main architecture includes an assignment to a function pointer. Offload architecture 2 calls the function referenced by that function pointer. In a second portion of code, offload architecture 1 includes an assignment to a function pointer and offload architecture 2 includes a call to the function referenced by that function pointer. The function assigned to the function pointer by both the main architecture and offload architecture 1 is the same function, and the pointer that is assigned is to the main architecture version of that function. Upon loading the code including the function pointer assignments, the loader 254 relocates the address, which is the same address, to point to the actual, relocated, address of the function.

Figure 6:
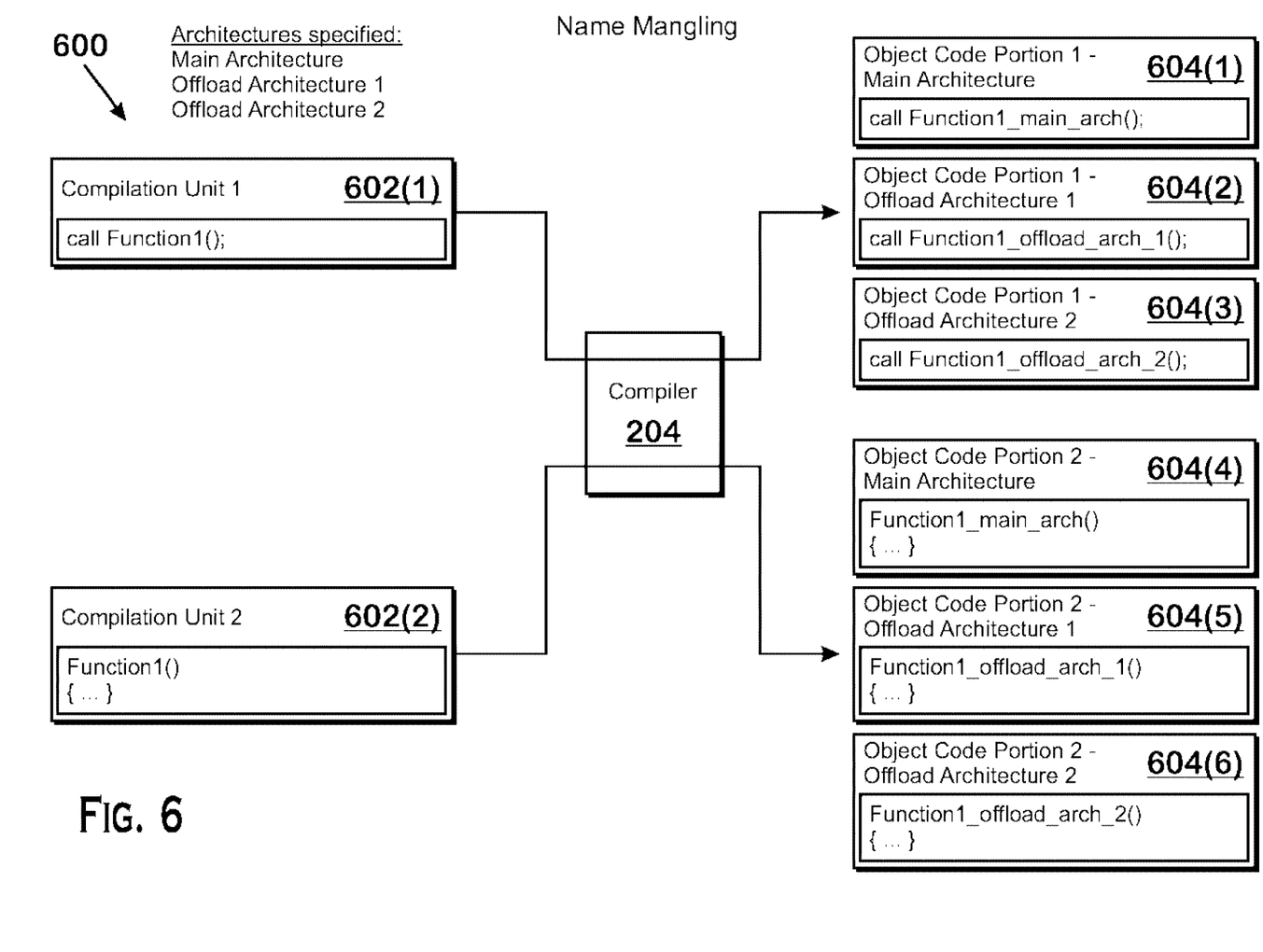
FIG. 6 illustrates a name mangling operation, according to an example.

FIG. 6 illustrates a name mangling operation 600, according to an example. As stated elsewhere herein, compilation occurs in two main stages—a front end stage and a back end stage. The front end stage converts source code to an intermediate representation and the back end stage generates machine instructions or intermediate language instructions. The compiler 204 generates an intermediate representation for a given compilation unit and generates object code portions for each architecture specified by that compilation unit. For external function references, the compiler modifies the symbolic name of functions as well as calls to the functions. For the names, the compiler 204 adds an indication of the targeted architecture to each function. For function calls, the compiler 204 modifies function calls made by a given architecture to refer to the name of the function with the added indication of the targeted architecture. These name modification operations are referred to herein as "name mangling."

In an example, a function is specified in a compilation unit that specifies three architectures—a main architecture, and two offload architectures. The compiler 204 compiles this function into three different object code portions—one for each architecture. The compiler 204 causes a function call from instructions for the main architecture to reference the version of the function for that architecture, causes a function call from instructions for offload architecture 1 to reference the version of the function for offload architecture 1, and causes a function call from instructions for offload architecture 2 to reference the version of the function for offload architecture 2.

In the example of FIG. 6, compilation unit 1 602(1) includes an instruction to call Function1. Compilation unit 2 602(2) includes the body of Function1. In addition, each of compilation unit 1 and compilation unit 2 are specified as targeting the main architecture, offload architecture 1, and offload architecture 2. The compiler converts compilation unit 1 602(1) and compilation unit 2 602(2) into three different versions, one for each architecture. For compilation unit 2 602(2), the compiler 204 name mangles Function1. Specifically, for each architecture, the compiler 204 generates a function for that architecture, and names that function the original function name, modified with an indication of the architecture targeted by that function. In the example of FIG. 6, for the version for the main architecture 604(4), the compiler 204 generates a function having the name Function1_main_arch. For the version for offload architecture 1, the compiler 204 generates a function having the name Function1_offload_arch_1. For the version for offload architecture 2, the compiler 204 generates a function having the name Function1_offload_arch_2.

The compiler 204 also modifies the different version of the compilation unit 1 code 602 to match the name mangled versions of the function names. Specifically, since compilation unit 1 calls Function 1, each version of compilation unit 1 is modified to call the appropriate version of Function 1 based on the architecture specified for the particular version. The compiler 204 modifies the version of compilation unit 1 generated for the main architecture 602(1) to call Function1_main_arch( ), which is the version of Function 1 name mangled for the main architecture. The compiler 204 also modifies the version of compilation unit 1 for offload architecture 1 to call Function1_offload_arch_1( ) and modifies the version of compilation unit 1 for offload architecture 2 to call Function1_offload_arch_2( ).

It should be understood that the operations described herein with respect to name mangling—generating multiple versions of functions, each having their names modified to include an indication of the associated architecture, and modifying the calls to such functions, are performed for any number of functions and function calls. In some example, the compiler 204 name mangles each function in source code that targets multiple architectures, modifying the calls to such functions to match the name mangled functions.

Figure 7:
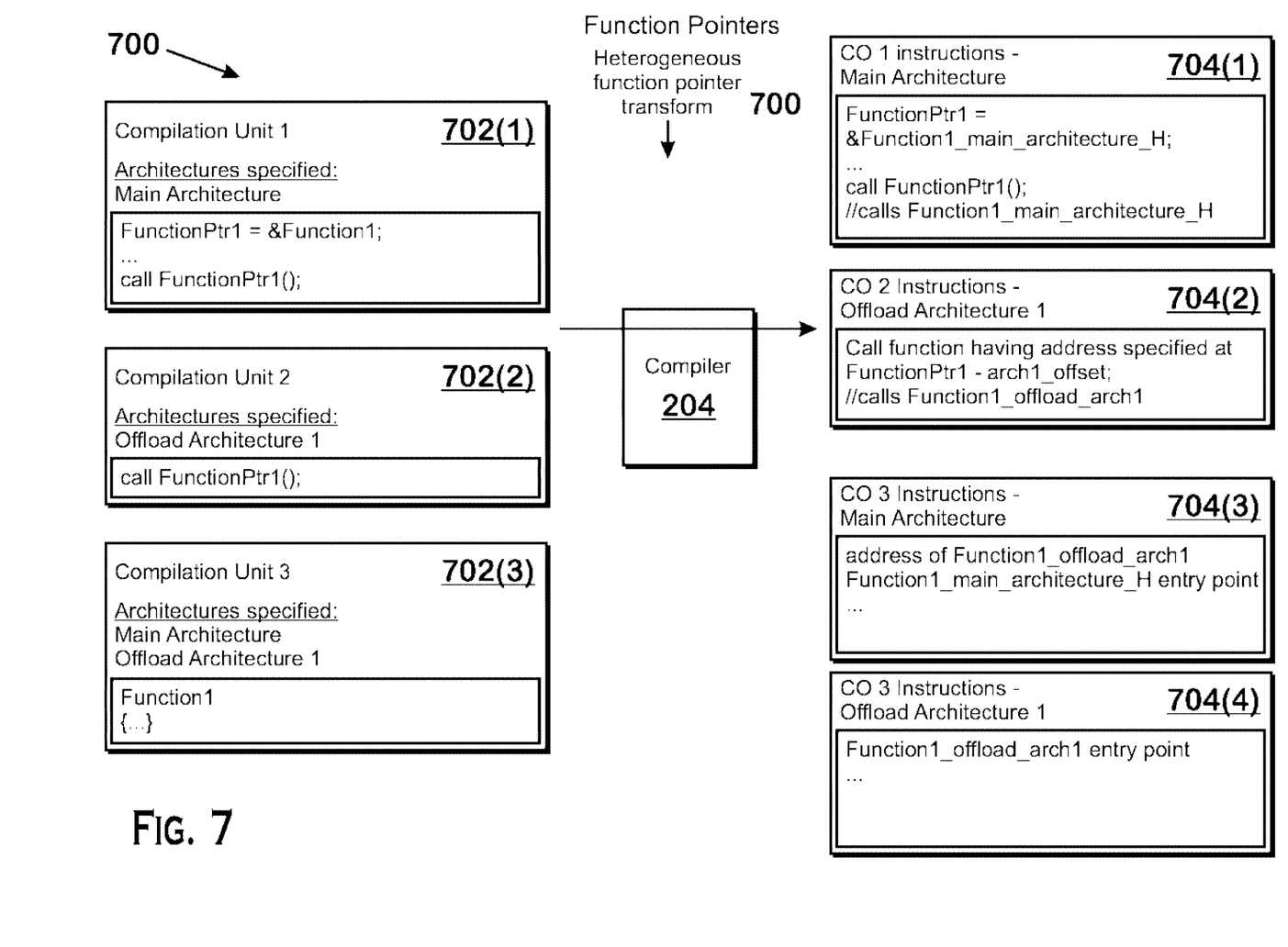
FIG. 7 presents some operations related to function pointers, including a heterogeneous function pointer transform, according to an example.

Some functions are called using function pointers. Function pointers are pointers that reference functions rather than data. Code declares a function pointer as a variable and then later code sets the function pointer to the address of a particular function. FIG. 7 presents some operations related to function pointers, including a heterogeneous function pointer transform 700, according to an example.

The compiler 204 compiles source code in a way that allows function pointers to be used across architectures, meaning that the same function pointer value can be passed between programs executing on different architectures and still be valid. To facilitate this flexibility, the compiler 204 compiles all function pointer assignments in source code (statements to assign the address of a function to a function pointer) into instructions to assign the address of the version of that function for the main architecture in object code. Calls using a function pointer differ based on whether the call is made by code executing on the main architecture or in a different architecture than the main architecture. For calls made by code executing on the main architecture, the compiler 204 compiles those calls normally. Specifically, the compiler 204 converts function pointer calls in source code that is to be executed on the main architecture into instructions to call the function at the address specified by the function pointer. For function pointer calls made by instructions executing on an architecture other than the main architecture, the compiler 204 converts such calls to call the function specified by an address that is located at a negative offset, in memory, from the address of the main architecture function. More specifically, in the executable 406, the compiler 204 places addresses of the offload architecture functions at memory addresses that are negative-offset-displaced from the address of the main architecture function. The compiler 204 also compiles calls to function pointers in non-main architecture source code into calls to functions having an address specified by the negative offset for the architecture of the call. In other words, the compiler 204 converts a function pointer call executing on an architecture other than the main architecture into one or more instructions that call the function whose address is indicated at the address stored in the function pointer minus an offset associated with the architecture other than the main architecture.

These operations allow function pointer values to be used across architectures because regardless of which architecture calls a function using a function pointer, the address assigned to the function pointer is the main architecture version of the function. This address is therefore valid across architectures.

In some instances, a compilation unit is not specified as being valid for the main architecture. In this instance, the compiler 204 selects one of the offload architectures to use as the main architecture for the purposes of the heterogeneous function pointer transform 700. Function pointers for that offload architecture are treated in a similar manner as function pointers for the main architecture. In other words, all function pointer assignments point to the version of the function for that offload architecture. Calls to function pointers are treated normally for that architecture, and are treated as for an offload architecture as described above, for other offload architectures.

The example of FIG. 7 illustrates a heterogeneous function pointer transform 700 in which the compiler 204 compiles three compilation units 702 into an executable 406. The first compilation unit 702(1) specifies the main architecture, and therefore the compiler 204 generates code object 1 (not shown) and resulting code object 1 instructions for the main architecture 704(1). The second compilation unit 702(2) specifies offload architecture 1 and therefore the compiler 204 generates code object 2 (not shown) and resulting code object 2 instructions for offload architecture 1. The third compilation unit 702(3) specifies both main architecture and offload architecture 1. Therefore, the compiler 204 generates code object 3 for both architectures and resulting code object 3 instructions for the main architecture 704(3) and code object 3 instructions for offload architecture 1 704(4).

Compilation unit 1 702(1) includes an assignment of the address of Function 1 (which is defined in compilation unit 3 702(3)) to the variable FunctionPtr1, and also includes a call to the function specified by FunctionPtr1. As stated elsewhere herein, regardless of which architecture assigns the address of a function to a function pointer, the compiler 204 causes such an assignment to assign the address of the version of the function for the main architecture. The assignment in compilation unit 1 702(1) is for the main architecture, but if that assignment were in a function compiled for offload architecture 1, then the compiler 204 would cause that assignment to assign the address of the main architecture version of the function, rather than the offload architecture 1 version of the function. The compiler 204 therefore compiles the assignment of FunctionPtr1 to be an assignment to Function1_main_architecture_H, which is the main architecture version of Function1. The "_H" suffix is an indication that the address is a heterogeneous entry point and thus can be used across architectures.

Compilation unit 2 702(2) is specified for offload architecture 1 and includes a call using the function pointer FunctionPtr1. The compiler converts this function pointer call, in code object 2 instructions for offload architecture 1 704(2), to one or more instructions that call the function at the address stored in the function pointer, minus an offset based on the architecture from which the call is made. In the example, the offset points to the address immediately prior to the address of the function pointed to by the function pointer (e.g., 4 bytes prior to the function). Thus the offset is equal to one times the value of an "addressing unit," where an addressing unit is the size of an instruction. In an example, other offsets, such as offsets for offload architecture 2, and offload architecture 3, are equal to two times the addressing unit and three times the addressing unit, respectively.

Compilation unit 3 702(3) is specified for both the main architecture and for offload architecture 1. Compilation unit 3 702(3) includes the body of Function1. As described elsewhere herein, the compiler 204 converts such a compilation unit 702(3) into two versions—one for each architecture specified. The assignment to the variable FunctionPtr causes that variable to point to the version of Function1 in the CO 3 instructions for the main architecture 704(3) (shown as "Function1_main_architecture_H entry point"— "CO" stands for "code object"). The call to that function in CO2 instructions 704(2), which are compiled for offload architecture 1, causes a function, having an address specified at Function1_main_architecture_H entry point minus the offset for architecture 1, to be called. The address at Function1_main_architecture_H entry point minus the offset for architecture 1 is the address of Function1_offload_arch1, as shown in code object 3 instructions for the main architecture 704(3). Thus the call to FunctionPtr1 results in a call to Function 1_offload_arch1.

By converting all assignments to function pointers to the address of the main architecture function, and by utilizing the call mechanism described herein, it is possible to pass function pointer values between architectures and have those function pointer values function correctly. More specifically, regardless of architecture, the function pointer value points to the main architecture version of the function. The address of the appropriate architecture function is located at a negative offset from the entry point to the main architecture function. Instructions for an offload architecture to call a function pointer result in a call to the function specified by the main architecture entry point minus the specific offset.

A specific mechanism for implementing heterogeneous function pointers has been described, in which the compiler 204 compiles an assignment to the function pointer as an assignment to the address of the main architecture function and in which the compiler 204 compiles a call to a function pointer as a call to the function having an address listed at a negative offset from the address of the function. However, alternative mechanisms exist for implementing heterogeneous function pointers. In one example, the negative-offset entries are one or more jump or branch instructions, rather than an address. To call a function via a function pointer in an architecture that is not the main architecture, the compiler 204 converts such a call to a jump instruction to a negative offset from the address specified in the function pointer, where the amount of the negative offset is based on the architecture making the function pointer call. The one or more jump or branch instructions that begin at that negative offset address cause execution to pass to the version of the function appropriate for the architecture making the function pointer call. In another example, instead of pointing directly to the address of the main architecture function, the assignment to a function pointer assigns the value of an entry in a procedure linkage table ("PLT"). Typically, a PLT is used where compile-time linkage is unable to resolve the destination of a function call, and in this scenario. In that scenario, the compiler 204 causes a function pointer call to call the function at an address listed at an appropriate PLT entry, and a runtime entity such as the loader 254 places the address of the targeted function in the entry. In this scenario, the compiler 204 compiles the assignment of a function address as an assignment of an entry in the PLT, which entry specifies the address of the designated function. The compiler 204 converts function calls for functions other than the main architecture into instructions that cause a function to be called, where the address of the function is at an architecture-specific negative offset from the address specified by the PLT entry for the main architecture function. In some implementations, virtual function tables are used to specify the addresses of virtual functions, such as in class-based programming languages (such as C++). Virtual function tables store the address of the main architecture functions. Assignment to a function pointer (the resolution of a polymorphic object into a specific class type) is converted to an assignment to an entry in a virtual function table. Calling a function using such a function pointer is accomplished by obtaining the address indicated by the virtual function table entry, and examining the contents at that address minus an offset whose value is based on the architecture, to find the address of the architecture-appropriate function. In some implementations, the compiler 204 mixes two or more of these variations in a single compilation. Note that relocations will occur to the PLT/virtual function tables. Specifically, instead of placing the addresses specified by the executable into those tables, the relocated addresses, as generated by the loader 254, are placed into those tables. Such relocations function across architectures, due to the mechanisms described above.

Figure 8:
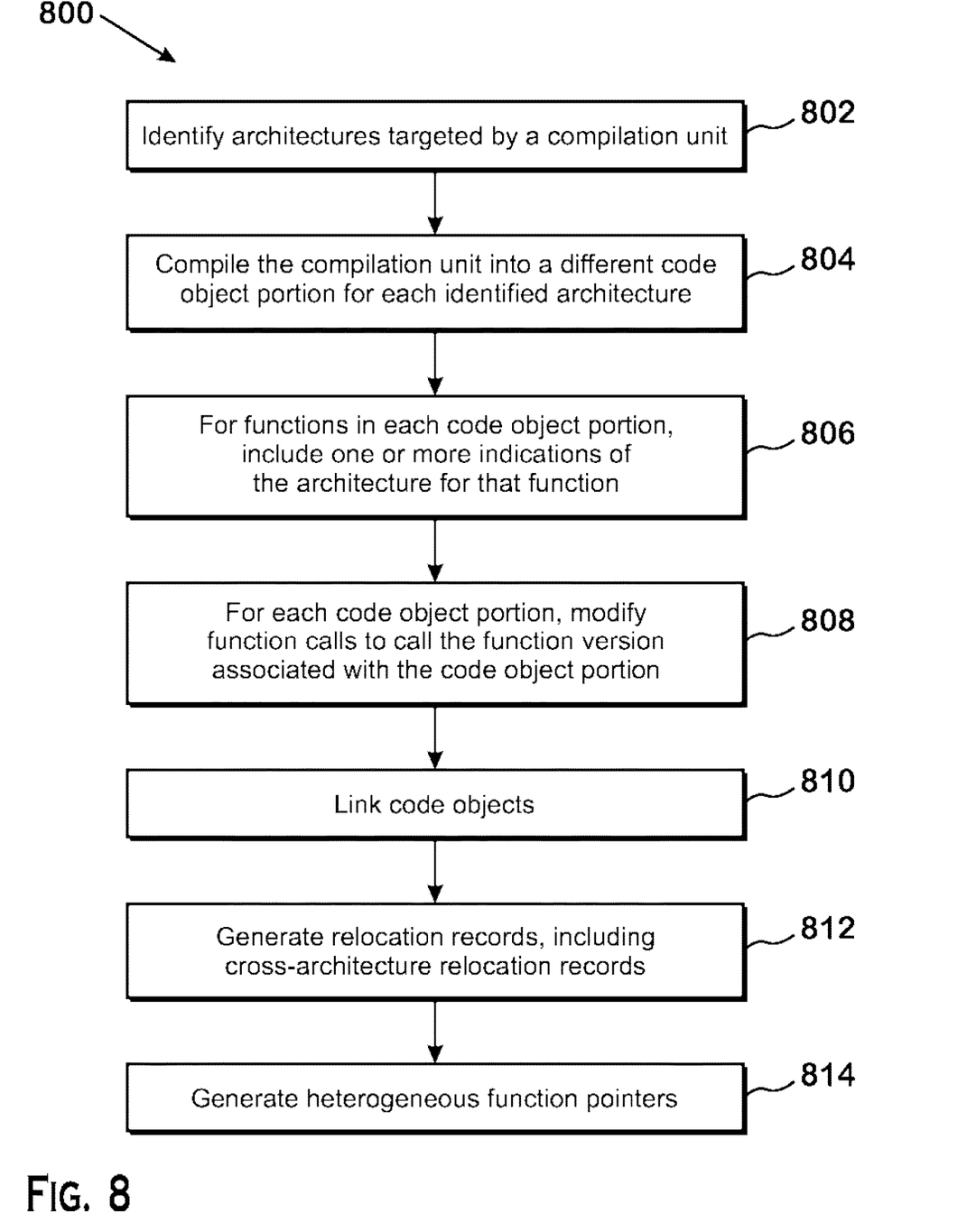
FIG. 8 is a flow diagram of a method 800 for generating an executable from source code, according to an example.

FIG. 8 is a flow diagram of a method 800 for generating an executable from source code, according to an example. Although described with respect to the system of FIGS. 1-7, those of skill in the art will understand that any system, configured to perform the steps of method 800 in any technically feasible order, falls within the scope of the present disclosure.

The method 800 begins at step 802, where the compiler 204 identifies the architectures targeted by a compilation unit 201. As described above, a compilation unit 201 is a unit of source code such as a source code file. The compilation units 201 indicate which architectures they target.

At step 804, the compiler 204 compiles the compilation unit 201 into a heterogeneous code object including multiple code object portions, one for each architecture specified by the compilation unit 201. Each code object portion includes instructions for the architecture associated with that code object portion. In one implementation, a front end of the compiler 204 generates an intermediate representation for the compilation unit 201. A back end of the compiler 204 processes the intermediate representation one time for each of the architectures specified for that compilation unit 201, in order to generate instructions appropriate for the specified architectures. The code object includes the instructions generated by the back end for each of the architectures and is thus a heterogeneous code object.

At step 806, the compiler 204 performs name mangling on function calls for each code object portion. Code object portions include function calls to external functions (functions outside of the code object). These function calls refer to the functions symbolically (e.g., by name). Name mangling involves modifying the name of a function (both in the function declaration and the function call) to include an indication of the architecture associated with the targeted function.

At step 808, the compiler 204 modifies function calls to call the name mangled function appropriate for the architecture of the code in which the function call is made. Typically, the architecture of the targeted function is the same as architecture of the calling code, and so the compiler 204 modifies function calls within a code object portion to refer to the version of the function appropriate for that architecture. Typically, this modification is done by modifying the function call to be a function call to the name-mangled function appropriate for the architecture of the calling code. Again, the operations of step 808 are for external functions—that is, calls to functions outside of the code object. It is possible for some references to functions to not be modified to refer to the function associated with the architecture for the calling code. For example, function pointer assignments are assignments to the version of the function for the main architecture. Herein, steps 806 and 808 are sometimes referred to collectively as "performing name mangling."

At step 810, a linker 208 links multiple code objects. Steps 802-808 are repeated for multiple code objects. Then the code objects are linked together into an executable. The linker 208 lays out the code objects in a range of addresses designated for the executable and the linker 208 modifies symbolic references of the code objects to references to memory addresses in the executable. The linker 208 also includes a global offset table that includes references to global variables and a procedure linkage table that includes references to functions that are to be linked at runtime.

At step 812, the compiler 204 generates relocation records for the code object, including cross-architecture relocation records. Relocation records are indications of references to memory addresses that are to be changed when instructions for the code object are loaded into memory for execution. Generally, such references point to "placeholder" memory addresses in the code object, and such addresses are not the correct addresses when the code object is loaded into memory for execution. The relocation records help the loader 254 modify such references to the correct addresses when loaded.

It is possible for relocation records to be "cross-architecture" meaning that the address referred to by the relocation record is used by instructions for multiple architectures. One example is a global offset table. Addresses in a global offset table sometimes refer to global variables that can be referenced by any architecture. Thus the relocation records include references to the addresses in a global offset table, which are relocated when the code object is loaded into memory. The relocation records cause references made by any architecture to an entry of the global offset table to be modified to the address of the actual entry when loaded into memory.

At step 814, the compiler 204 generates heterogeneous function pointers. As described elsewhere herein, an assignment to a function pointer assigns the address of the main architecture version of the function pointer. An instruction, executed by an architecture other than the main architecture, to call the function specified by a function pointer, causes a function to be called based on an address that is offset in a negative direction from the address specified by the function pointer. The magnitude of the negative offset is based on the architecture making the function call.

Figure 9:
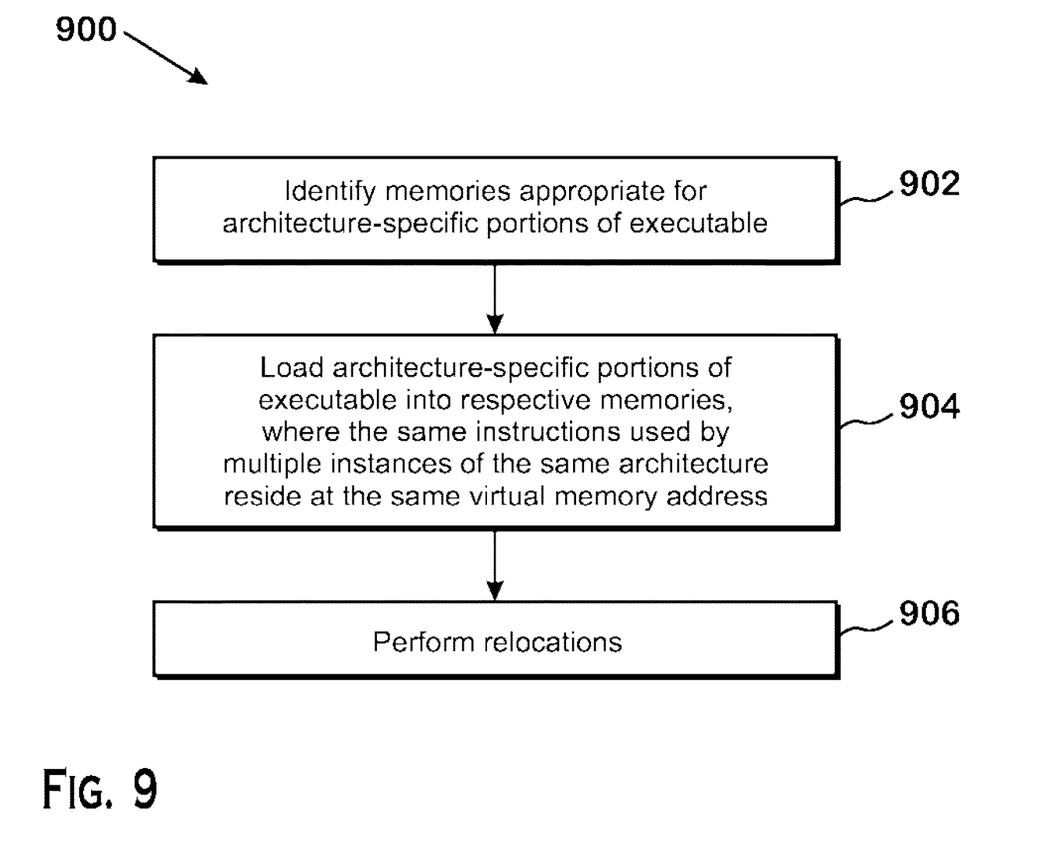
FIG. 9 is a flow diagram of a method for running an heterogeneous code object executable, according to an example.

FIG. 9 is a flow diagram of a method 900 for running an heterogeneous code object executable, according to an example. Although described with respect to the system of FIGS. 1-7, those of skill in the art will understand that any system, configured to perform the steps of method 900 in any technically feasible order, falls within the scope of the present disclosure.

At step 902, a loader 254 identifies memories appropriate for architecture-specific portions of the executable. In an implementation, the loader 254 consults a memory manager 510 to identify memories appropriate for a given architecture. In some examples, memory that is appropriate for a given architecture is memory that is "local" to that architecture. In an example, system memory is local to a central processing unit and graphics memory is local to a graphics processing unit. At step 904, the loader 254 loads architecture-specific portions of an executable into the identified memories. The loader 254 assigns virtual memory addresses to the various portions of the executable. For an architecture including multiple instances of a processing unit for that architecture, the loader 254 loads the portions of the executable for that architecture into memory once in a read-only state. Each such instance that executes those portions is provided with the virtual memory addresses. When an instance of that architecture accesses these portions of the executable, a memory manager 510 causes those portions to be copied to memory local to the instance. In an example, four GPUs access and execute code loaded into memory only once by the loader 254. When one of the GPUs accesses the code, the memory manager 510 copies the instructions to memory local to that GPU. Loading the program into memory only once regardless of the number of processor instances allows changes, such as relocations, to be made only once and then copied.

At step 906, the loader 254 performs relocations, including one or more cross-architecture relocations. The relocation occurs by modifying a placeholder reference to a memory address in the code to a reference to the corresponding actual memory address in the loaded code. A cross-architecture relocation includes modifying a reference to the same address in code executed on two or more different architectures, so that instead of referring to a placeholder address, the reference refers to the same actual address.

Once loaded into memory, the executable runs. The various architectures execute the instructions as directed. Part of execution includes executing functions specified by function pointers. As described elsewhere herein, assigning a function pointer includes assigning the address of the main architecture version of the function. Calling the function pointer on an architecture other than the main architecture includes calling a function specified by instructions or an address located at a negative offset from the value in the function pointer (which stores the address of the main architecture version of the function).

It should be understood that many variations are possible based on the disclosure herein. For example, although it has been described that function pointers for offload architecture functions are at negative offsets from the address of the function for the main architecture, in various alternative examples, the function pointers for the offload architecture functions are at a non-negative offset from the address for the main architecture function. In other alternative examples, any technically feasible operation is used to calculate function pointers for the offload architecture function based on the function pointer address for the main architecture. In some examples, the technically feasible operation includes any possible combination of bitwise operations and/or other types of operations. Although features and elements are described above in particular combinations, each feature or element can be used alone without the other features and elements or in various combinations with or without other features and elements.

The various system elements described herein and/or depicted in the Figures are implemented as software executing on a processor, hardware (circuitry) configured to perform the functions described, or combinations thereof. In various examples, the input driver 112 and output driver 114 are implemented as software, hardware, or a combination thereof. The compiler 204, linker 208, and loader 254 are implemented as software executing on a processor and in some alternative implementations, function in conjunction with fixed function hardware (circuitry). The memory manager 510 and write-fault handler 512 are embodied as software executing on a processor, hardware circuitry, or a combination thereof. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for loading a heterogeneous code object executable, the method comprising:
    loading, by an operating system, a first architecture-specific portion of the heterogeneous code object executable into a first memory, wherein the first architecture-specific portion includes instructions for a first architecture;
    loading, by the operating system, a second architecture-specific portion of the heterogeneous code object executable into a second memory, wherein the second architecture-specific portion includes instructions for a second architecture that is different than the first architecture;
    wherein the first architecture-specific portion includes a first function call configured to call a first function having a first memory location located at a first address, and
    wherein the second architecture-specific portion includes a second function call configured to call a second function at a second address that is stored at a second memory location that is at an architecture-specific offset from the first memory location of the first function, wherein the offset is based on the second architecture and is specified by a same value for each function pointer call for the second architecture.

2. The method of claim 1, wherein the first function call comprises a first function pointer call and the first address is specified by a first function pointer.

3. The method of claim 2, wherein the second function call comprises a second function pointer call and the second address is stored at a memory location that is at the offset from the first address.

4. The method of claim 1, wherein the offset is a negative offset.

5. The method of claim 2, wherein the first architecture-specific portion is configured to pass the first function pointer to the second architecture-specific portion.

6. The method of claim 5, wherein the second architecture-specific portion is configured to call the second function by locating an address stored at a negative offset from the first address specified.

7. The method of claim 1, further comprising relocating addresses for the first function call and the second function call.

8. The method of claim 7, wherein relocating the addresses comprises relocating the same address for both the first function call and the second function call.

9. The method of claim 1, further comprising identifying the first memory as a memory local to the first architecture and identifying the second memory as a memory local to the second architecture.

10. A system for loading a heterogeneous code object executable, the system comprising:
a processor; and
a memory storing an operating system, the operating system not being part of the heterogeneous code object executable, wherein the operating system includes instructions that, when executed by the processor, cause the processor to load the heterogeneous code object executable by:
loading, by an operating system, a first architecture-specific portion of the heterogeneous code object executable into a first memory, wherein the first architecture-specific portion includes instructions for a first architecture;
loading, by the operating system, a second architecture-specific portion of the heterogeneous code object executable into a second memory, wherein the second architecture-specific portion includes instructions for a second architecture that is different than the first architecture;
wherein the first architecture-specific portion includes a first function call configured to call a first function having a first memory location located at a first address, and
wherein the second architecture-specific portion includes a second function call configured to call a second function at a second address that is stored at a second memory location that is at an architecture-specific offset from the first memory location of the first function, wherein the offset is based on the second architecture and is specified by a same value for each function pointer call for the second architecture.

11. The system of claim 10, wherein the first function call comprises a first function pointer call and the first address is specified by a first function pointer.

12. The system of claim 11, wherein the second function call comprises a second function pointer call and the second address is stored at a memory location that is at the offset from the first address.

13. The system of claim 10, wherein the offset is a negative offset.

14. The system of claim 11, wherein the first architecture-specific portion is configured to pass the first function pointer to the second architecture-specific portion.

15. The system of claim 14, wherein the second architecture-specific portion is configured to call the second function by locating an address stored at a negative offset from the first address specified.

16. The system of claim 10, wherein the instructions further cause the processor to relocate addresses for the first function call and the second function call.

17. The system of claim 16, wherein relocating the addresses comprises relocating the same address for both the first function call and the second function call.

18. The system of claim 10, wherein the instructions further cause the processor to identify the first memory as a memory local to the first architecture and identifying the second memory as a memory local to the second architecture.

19. A non-transitory computer-readable medium storing instructions that, when executed by a processor, cause the processor to load a heterogeneous code object executable by:
loading, by an operating system, a first architecture-specific portion of the heterogeneous code object executable into a first memory, wherein the first architecture-specific portion includes instructions for a first architecture;
loading, by the operating system, a second architecture-specific portion of the heterogeneous code object executable into a second memory, wherein the second architecture-specific portion includes instructions for a second architecture that is different than the first architecture;
wherein the first architecture-specific portion includes a first function call configured to call a first function having a first memory location located at a first address, and
wherein the second architecture-specific portion includes a second function call configured to call a second function at a second address that is stored at a second memory location that is at an architecture-specific offset from the first memory location of the first function, wherein the offset is based on the second architecture and is specified by a same value for each function pointer call for the second architecture.

20. The non-transitory computer-readable medium of claim 19, wherein:
the first function call comprises a first function pointer call and the first address is specified by a first function pointer.

* * * * *